United States Patent
Satsuka

(10) Patent No.: US 10,158,777 B2
(45) Date of Patent: Dec. 18, 2018

(54) IMAGE PROCESSING APPARATUS INCLUDING A CORRECTION CIRCUIT CONFIGURED TO STOP FORMATION OF AN INCLINATION-CORRECTED LINE IN A MAIN SCANNING DIRECTION, IMAGE FORMING APPARATUS, IMAGE PROCESSING METHOD AND NON-TRANSITORY COMPUTER READABLE MEDIUM

(71) Applicant: Akifumi Satsuka, Kanagawa (JP)

(72) Inventor: Akifumi Satsuka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/718,007

(22) Filed: Sep. 28, 2017

(65) Prior Publication Data
US 2018/0124268 A1    May 3, 2018

(30) Foreign Application Priority Data

Oct. 31, 2016   (JP) .................... 2016-213097

(51) Int. Cl.
*H04N 1/04*   (2006.01)
*H04N 1/00*   (2006.01)
(Continued)

(52) U.S. Cl.
CPC ..... *H04N 1/00793* (2013.01); *H04N 1/00742* (2013.01); *H04N 1/193* (2013.01); *H04N 1/2104* (2013.01)

(58) Field of Classification Search
None
See application file for complete search history.

(56) References Cited

U.S. PATENT DOCUMENTS 5,912,448 A * 6/1999 Sevier ............... H04N 1/00681
235/454
6,999,209 B2 * 2/2006 Kelly .................. G06K 9/32
358/450

(Continued)

FOREIGN PATENT DOCUMENTS

| JP | 2001-101399 | 4/2001 |
| JP | 2006-296640 | 11/2006 |
| JP | 2017-118454 | 6/2017 |

*Primary Examiner* — Dung D Tran
(74) *Attorney, Agent, or Firm* — Harness, Dickey & Pierce, P.L.C.

(57) ABSTRACT

An image processing apparatus includes a memory, a correction circuit, and a calculation circuit. The memory stores image data of an original image that is moved in a sub-scanning direction with respect to an image sensor. The correction circuit sequentially reads the image data from the memory line by line in the main scanning direction, extracts a pixel in a position corresponding to the inclination, and forms an inclination-corrected line in the main scanning direction to correct the inclination. The calculation circuit calculates an amount of movement of a corner of the original image with respect to the sub-scanning direction before and after correction of inclination of the original image with respect to a main scanning direction. The correction circuit restricts progress of formation of the inclination-corrected line based on the amount of movement. The amount of movement is applied when the inclination of the original image is corrected.

16 Claims, 15 Drawing Sheets

(51) Int. Cl.
*H04N 1/193* (2006.01)
*H04N 1/21* (2006.01)

(56) References Cited

U.S. PATENT DOCUMENTS

| | | | |
|---|---|---|---|
| 7,690,745 B2 * | 4/2010 | Ouchi | B41J 11/0065 |
| | | | 347/14 |
| 8,903,173 B2 * | 12/2014 | Cooper | H04N 1/3873 |
| | | | 345/156 |
| 2006/0039628 A1 * | 2/2006 | Li | H04N 1/3873 |
| | | | 382/289 |
| 2009/0268264 A1 * | 10/2009 | Minamino | H04N 1/3878 |
| | | | 358/474 |
| 2011/0085216 A1 * | 4/2011 | Noh | H04N 1/3878 |
| | | | 358/498 |
| 2015/0319335 A1 * | 11/2015 | Baba | H04N 1/047 |
| | | | 358/447 |
| 2017/0187916 A1 | 6/2017 | Ohta et al. | |

* cited by examiner

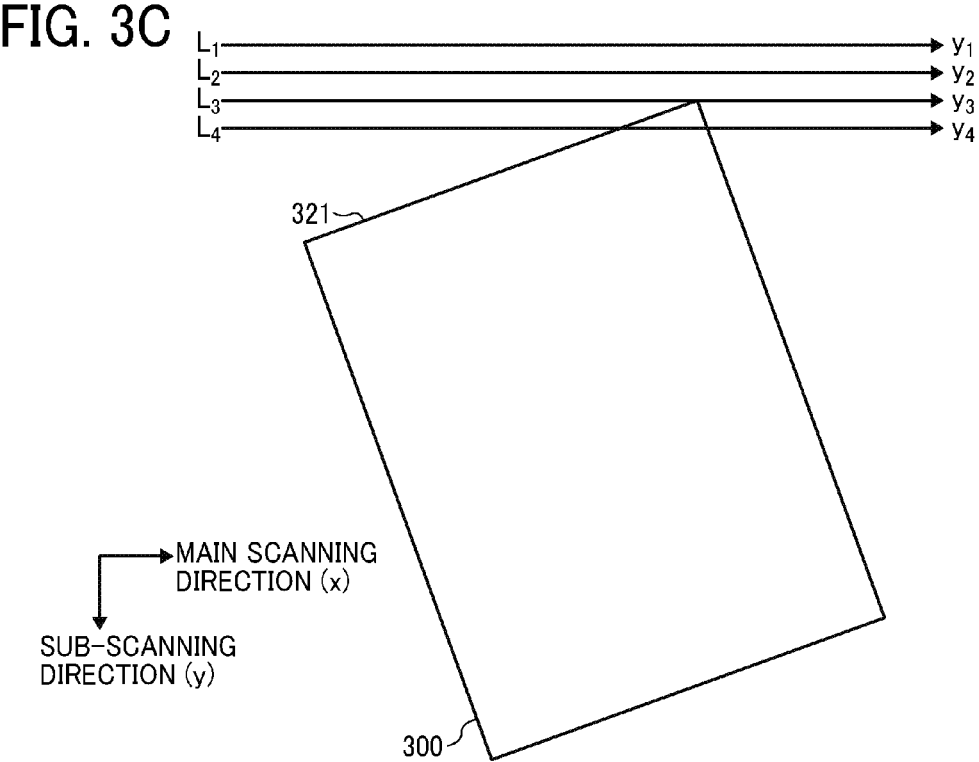
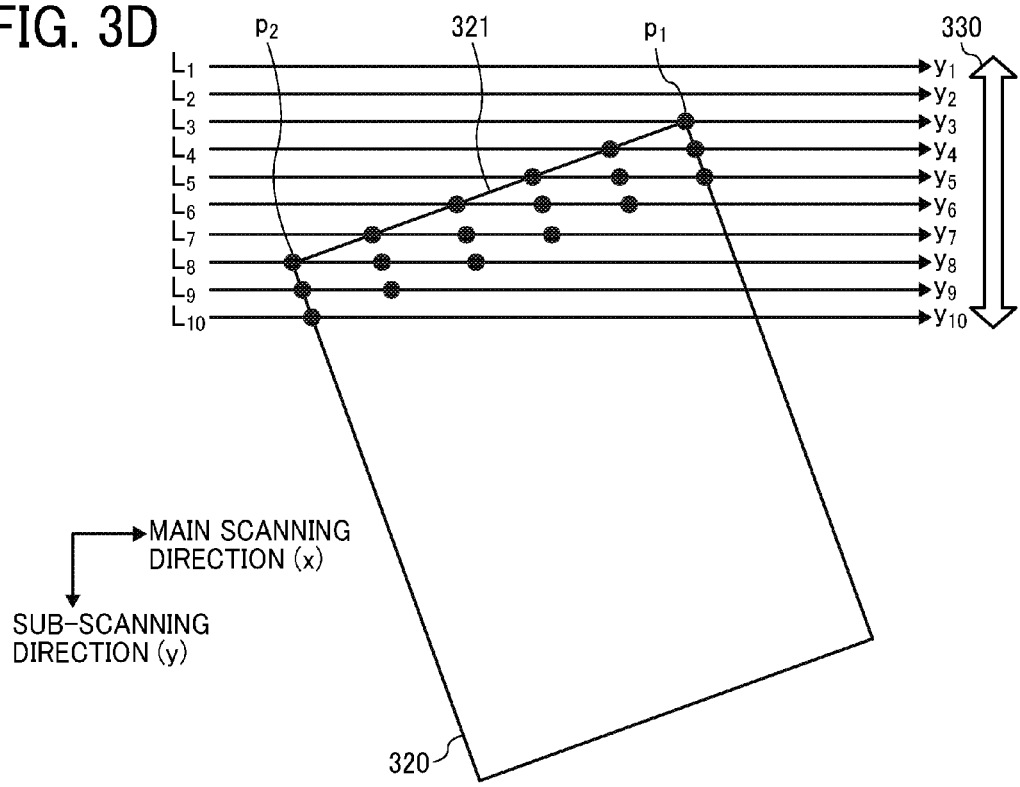

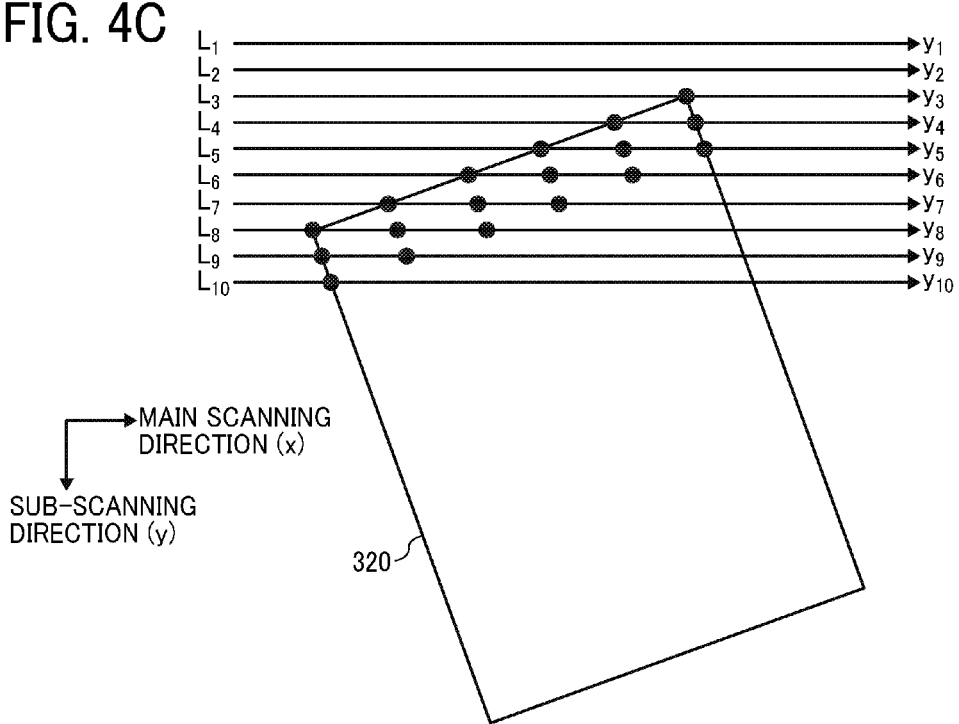
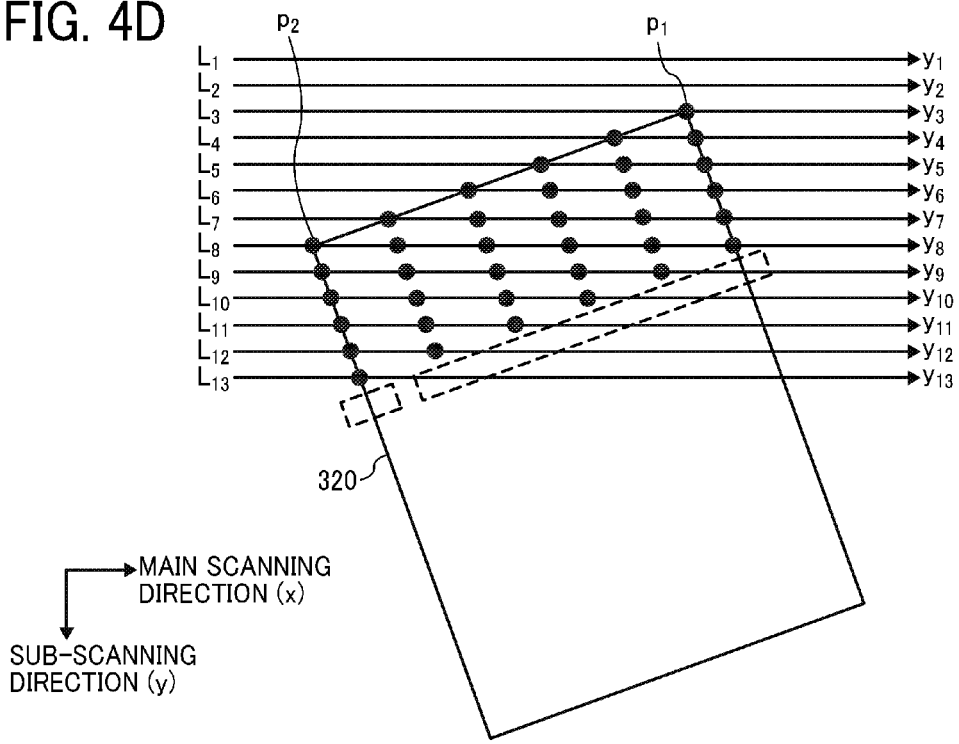

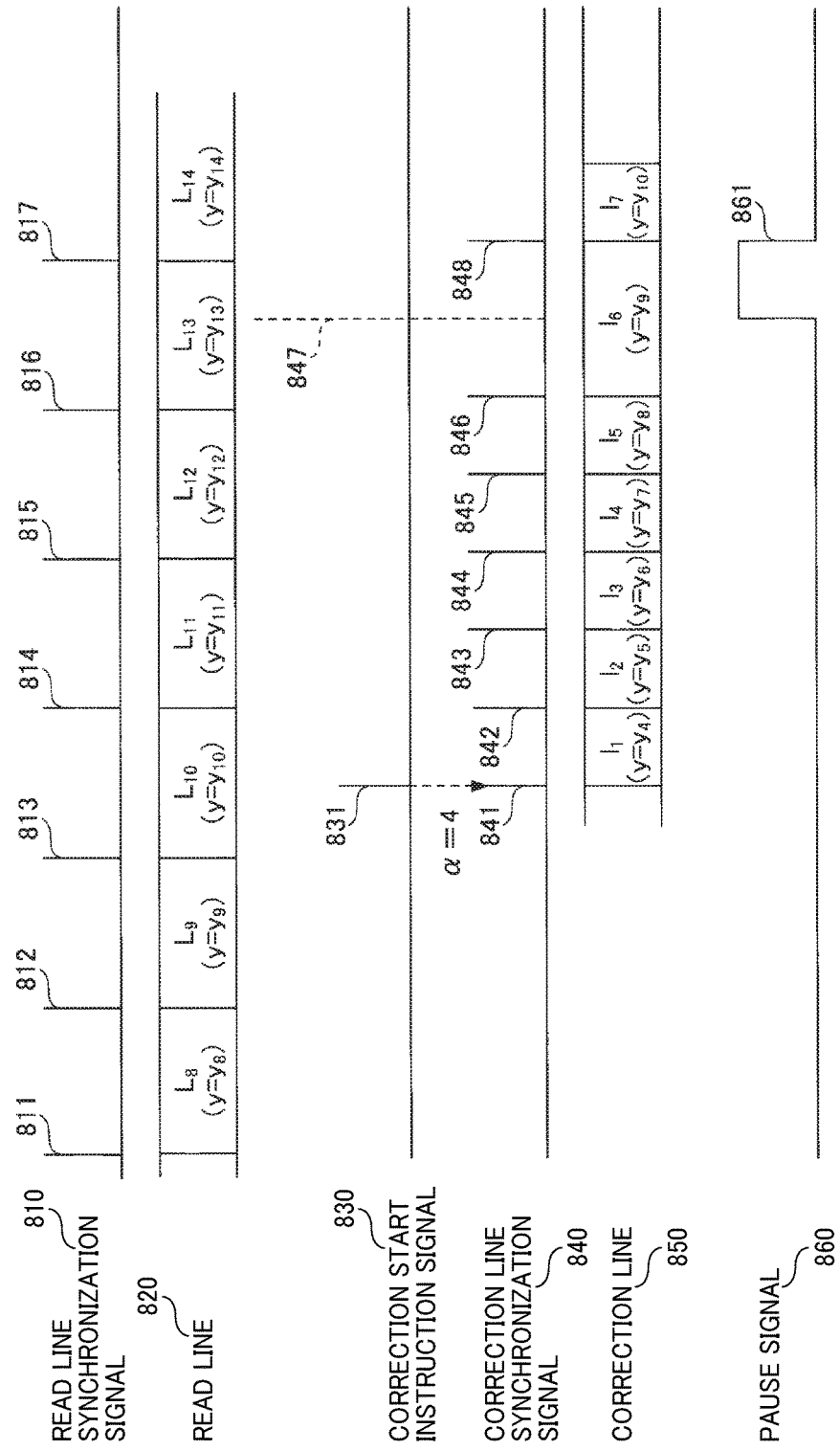

IMAGE PROCESSING APPARATUS INCLUDING A CORRECTION CIRCUIT CONFIGURED TO STOP FORMATION OF AN INCLINATION-CORRECTED LINE IN A MAIN SCANNING DIRECTION, IMAGE FORMING APPARATUS, IMAGE PROCESSING METHOD AND NON-TRANSITORY COMPUTER READABLE MEDIUM

CROSS-REFERENCE TO RELATED APPLICATION

This patent application is based on and claims priority pursuant to 35 U.S.C. § 119 to Japanese Patent Application No. 2016-213097, filed on Oct. 31, 2016, in the Japan Patent Office, the entire disclosure of which is hereby incorporated by reference herein.

BACKGROUND

Technical Field

Exemplary aspects of the present disclosure relate to an image processing apparatus, an image forming apparatus, and an image processing method.

Related Art

Image forming apparatuses such as copiers and scanners include a scanner unit that reads an original document, and an image processing apparatus that performs various processes on image data read by the scanner unit.

The various processes performed by the image processing apparatus include an inclination correction process. The original document can skew with respect to the scanner unit while being conveyed, and such a skew can cause inclination of an original image area in the image data. The inclination correction process corrects such inclination of the original image area in the image data. The image processing apparatus performs the inclination correction process by following a writing process in which the image data read by the scanner unit is written in a memory.

Particularly, the scanner unit scans an original image in a main scanning direction to acquire image data line by line. The image processing apparatus sequentially writes the image data acquired line by line in a memory. Meanwhile, the image processing apparatus sequentially reads the image data already written in the memory from the memory line by line. Accordingly, the image processing apparatus performs the inclination correction process according to inclination of the original image.

Thus, such inclination correction process can reduce processing time from the reading of the original image by the scanner to the output of inclination-corrected image data.

SUMMARY

In at least one embodiment of this disclosure, there is provided an improved image processing apparatus that includes a memory, a correction circuit, and a calculation circuit. The memory stores image data of an original image that is moved in a sub-scanning direction with respect to an image sensor that scans the original image in a main scanning direction to generate the image data. The correction circuit sequentially reads the image data from the memory line by line in the main scanning direction, extracts a pixel in a position corresponding to the inclination, and forms an inclination-corrected line in the main scanning direction to correct the inclination of the original image. The calculation circuit calculates an amount of movement of a corner of the original image with respect to the sub-scanning direction before and after correction of inclination of the original image with respect to the main scanning direction. The correction circuit restricts progress of the formation of the inclination-corrected line in the main scanning direction based on the amount of movement. The amount of movement is applied when the inclination of the original image is corrected.

Further provided is an improved image processing method that includes storing, correcting, and calculating. The storing stores image data of an original image that is moved in a sub-scanning direction with respect to an image sensor that scans the original image in a main scanning direction to generate the image data. The correcting corrects the inclination of the original image, and includes reading, extracting, and forming. The reading sequentially reads the image data from a memory line by line in the main scanning direction. The extracting extracts a pixel in a position corresponding to the inclination. The forming forms an inclination-corrected line in the main scanning direction. The calculating calculates an amount of movement of a corner of the original image with respect to the sub-scanning direction before and after correction of the inclination of the original image with respect to the main scanning direction, the amount of movement being applied when the inclination of the original image is corrected. The correcting restricts progress of formation of the inclination-corrected line in the main scanning direction based on the amount of movement.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIGS. 3A through 3F are diagrams illustrating various processes performed by the inclination corrector;

FIGS. 4A through 4F are diagrams illustrating a restrictive condition on progress of an inclination correction process;

FIG. 8 is a diagram illustrating one example of a timing chart of the inclination correction process.

Figure 1:
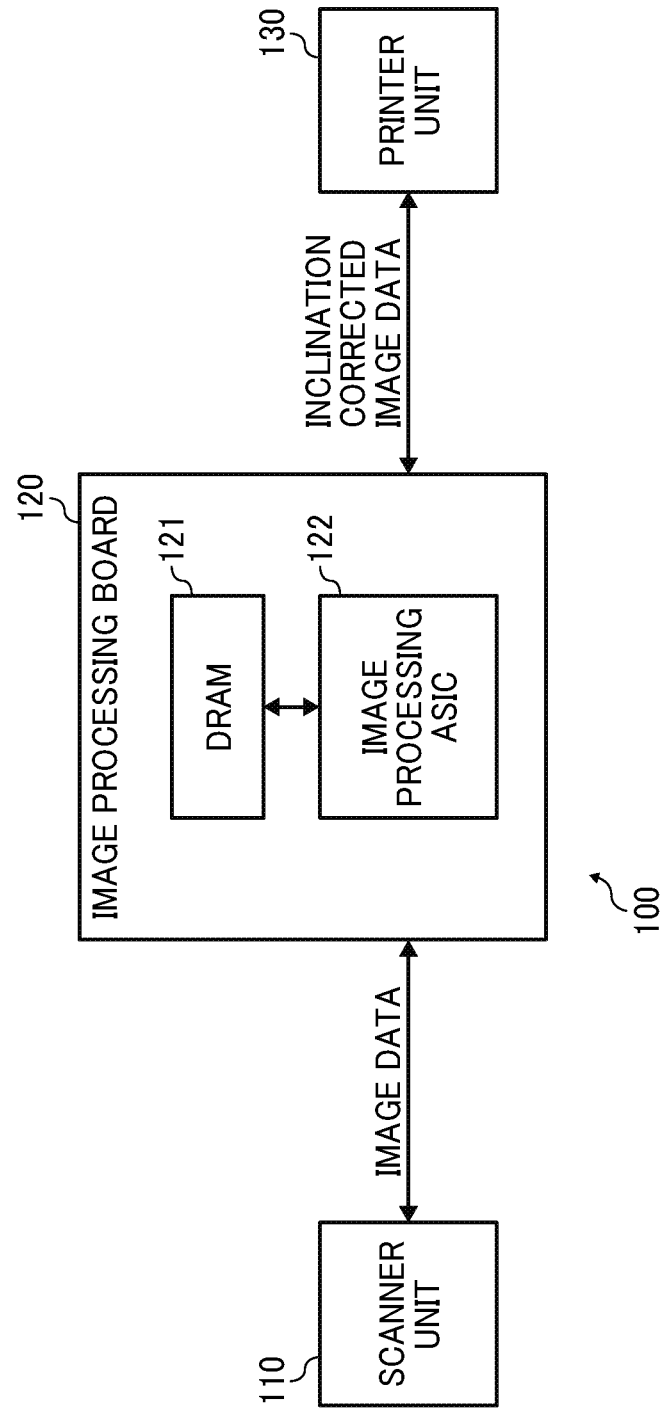
FIG. 1 is a diagram illustrating one example of an overall configuration of an image forming apparatus and a hardware configuration of an image processing apparatus.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity.

However, the disclosure of this patent specification is not intended to be limited to the specific terminology so selected and it is to be understood that each specific element includes all technical equivalents that have the same function, operate in a similar manner and achieve similar results.

Although the exemplary embodiments are described with technical limitations with reference to the attached drawings, such description is riot intended to limit the scope of the disclosure and all of the components or elements described in the exemplary embodiments of this disclosure are not necessarily indispensable.

Referring now to the drawings, exemplary embodiments of the present disclosure are described below. In the drawings for explaining the following exemplary embodiments, the same reference codes are allocated to elements (members or components) having the same function or shape and redundant descriptions thereof are omitted below.

First Embodiment

<1. Overall Configuration of Image Forming Apparatus and Hardware Configuration of Image Processing Apparatus>

First, an overall configuration of an image forming apparatus 100 according to an exemplary embodiment and a hardware configuration of an image processing apparatus (also called an image processing board) 120 of the image forming apparatus 100 are described.

FIG. 1 illustrates one example of the overall configuration of the image forming apparatus 100 and the hardware configuration of the image processing apparatus 120. As illustrated in FIG. 1, the image forming apparatus 100 includes a scanner unit 110, the image processing board 120, and a printer unit 130.

The scanner unit 110 includes an image sensor in which a plurality of sensor elements is arranged in a main scanning direction. The term "image sensor" used herein includes, for example, a charge-coupled device (CCD), a contact image sensor (CIS), and a complementary metal oxide semiconductor (CMOS). The image sensor is disposed in a reading position to scan an original image in a main scanning direction when the original image is conveyed in a sub-scanning direction, thereby generating image data. Then, the image sensor transmits the generated image data to the image processing board 120.

The image processing board 120 as one example of an image processing apparatus performs various processes on the image data transmitted from the scanner unit 110. The present exemplary embodiment is described using an inclination correction process for correcting inclination of a document image in image data out of the various processes performed by the image processing board 120. Thus, in FIG. 1, a hardware configuration related to the inclination correction process is illustrated as a hardware configuration of the image processing board 120.

As illustrated in FIG. 1, the image processing board 120 includes a dynamic random access memory (DRAM) 121, and an image processing application specific integrated circuit (image processing ASIC) 122.

The DRAM 121 as one example of a memory temporarily retains the image data transmitted by the scanner unit 110. The image data is written in the DRAM 121 by the image processing ASIC 122 for each scanning line in the main scanning direction. Moreover, the image data written in the DRAM 121 is sequentially read by the image processing ASIC 122 fine by line.

The image processing ASIC 122 as an integrated circuit for image process writes the image data transmitted by the scanner unit 110 in the DRAM 121 for each scanning line in the main scanning direction, and sequentially reads the image data already written in the DRAM 121 line by line. Moreover, the image processing ASIC 122 performs the inclination correction process based on the read image data, and transmits inclination-corrected image data (image data of an original image area) to the printer unit 130.

The printer unit 130 prints a color image on a sheet (e.g., an output medium) according to a predetermined image forming method, for example, an electrophotographic method. If the electrophotographic method is employed, the printer unit 130 includes a plurality of units (each including an optical writing unit, a developing unit, a transfer unit, a fixing unit, a charging unit, and a cleaning unit) for different color around respective photoconductors that are rotated. The plurality of units is operated, so that the printer unit 130 prints a color image.

Particularly, the optical wiring unit emits writing light modulated based on the inclination-corrected image data to form an electrostatic latent image on the photoconductor uniformly charged by the charging unit. The developing unit supplies toner to the photoconductor on which the electrostatic latent image is formed to develop the electrostatic latent image as a toner image. The transfer unit sequentially transfers the toner images developed on the photoconductor to a sheet conveyed between the transfer unit and the photoconductor. The fixing unit fixes the toner image transferred to the sheet. The cleaning unit removes the toner remaining on the photoconductor. Such operations are performed by each of the plurality of units for the different color, so that printing of the inclination-corrected image data is completed.

<2. Functional Configuration of Image Processing ASIC>

Next, a function relating to the inclination correction process performed by the image processing ASIC 122 is described.

Figure 2:
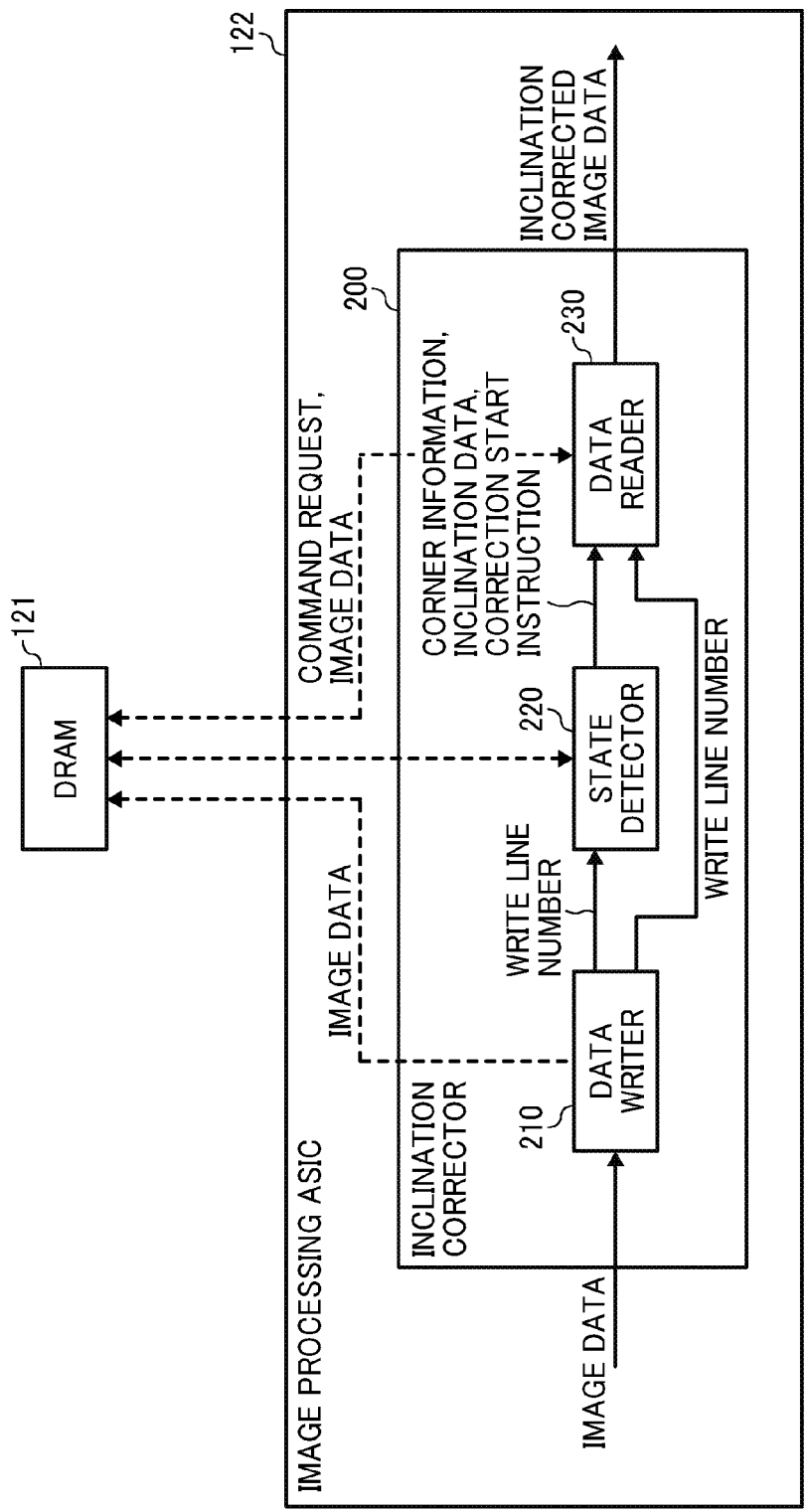
FIG. 2 is a diagram illustrating one example of a functional configuration of an inclination corrector of an image processing application specific integrated circuit (image processing ASIC)

FIG. 2 is a diagram illustrating one example of a functional configuration of an inclination corrector 200 of the image processing ASIC 122. As illustrated in FIG. 2, the inclination corrector 200 as a correction circuit includes a data writer 210, a state detector 220, and a data reader 230.

The data writer 210 writes the image data transmitted by the scanner unit 110 in the DRAM 121 for each scanning line in the main scanning direction. Moreover, the data writer 210 notifies each of the state detector 220 and the data reader 230 of a write line number indicating a line being written in the DRAM 121.

The image data is written in the DRAM 121 by the data writer 210. Meanwhile, the state detector 220 sequentially reads the image data line by line from the DRAM 121 upon receipt of the write line number notified by the data writer 210. The state detector 220 reads the image data of the predetermined number of lines. The state detector 220 detects two corners (right and left corners on a leading end side of the original image in a conveyance direction) of the original image based on the image data of the predetermined number of lines, and notifies the data reader 230 of position coordinates of the two detected corners as corner information.

Moreover, the state detector 220 calculates inclination of the original image with respect to the main scanning direction from relative positions of the two corners of the original image. Then, the state detector 220 notifies the data reader 230 of the calculated inclination as inclination data. Subsequently, the state detector 220 notifies the data reader 230 of a correction start instruction.

The image data is written in the DRAM 121 by the data writer 210. Meanwhile, the data reader 230 sequentially reads the image data line by line from the DRAM 121 upon receipt of the write line number notified by the data writer 210. Moreover, upon receipt of the correction start instruction from the state detector 220, the data reader 230 performs the inclination correction process on the image data read from the DRAM 121.

Particularly, the data reader 230 performs the inclination correction process on the read image data based on the inclination data and the corner information notified by the state detector 220 to generate inclination-corrected image data (image data of the original image area) line by line. In the present exemplary embodiment, a cycle in which the data reader 230 generates the inclination-corrected image data line by line is set shorter than a writing cycle in which image data is written in the DRAM 121 and a reading cycle in which image data is read from the DRAM 121.

According to the present exemplary embodiment, therefore, a delay of the inclination correction process with respect to the writing process for writing the image data in the DRAM 121 and the reading process for reading the image data from the DRAM 121 can be recovered although the inclination correction process begins after the collection start instruction is notified by the state detector 220. As a result, processing time from the beginning of the writing process for writing the image data in the DRAM 121 by the data writer 210 to the output of the inclination-corrected image data by the data reader 230 can be reduced.

When performing the inclination correction process, the data reader 230 sets a restrictive condition on progress of the inclination correction process (a detailed description is below) such that there is no mismatch between the inclination correction process and each of the writing process for wiring the image data in the DRAM 121 and the reading process for reading the image data from the DRAM 121.

<3. Overview of Each Process Performed by Inclination Corrector>

Next, a description is given of each of various processes (a writing process, a reading process, and an inclination correction process) performed by the inclination corrector 200.

Figure 3A:
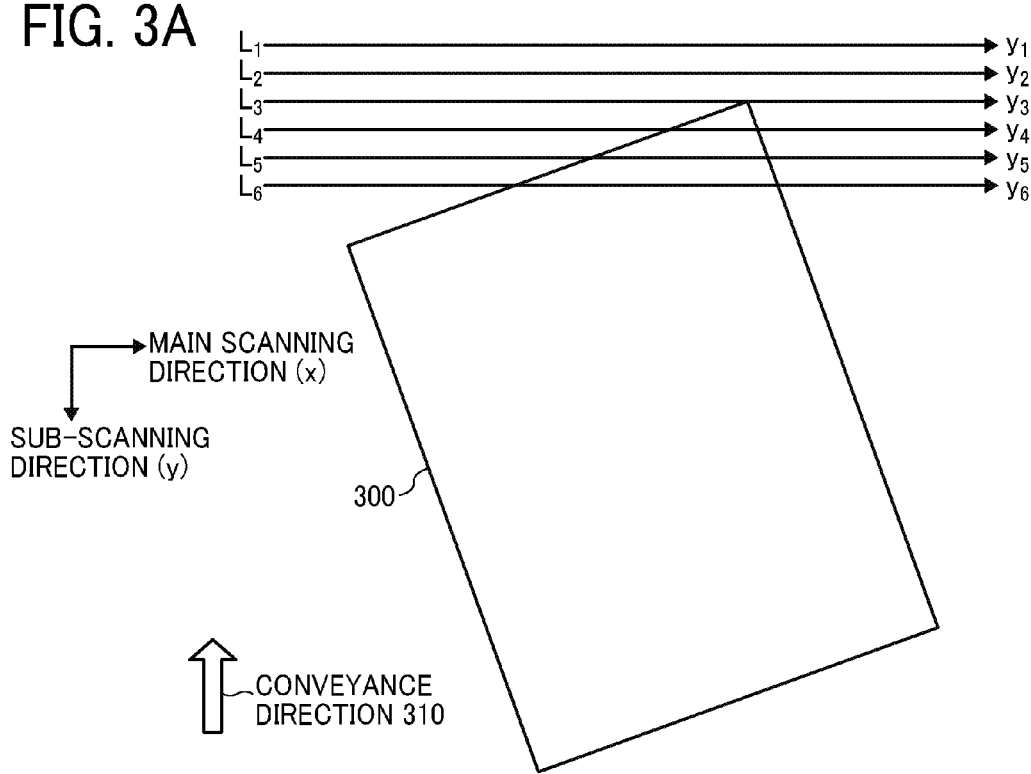
Figure 3B:
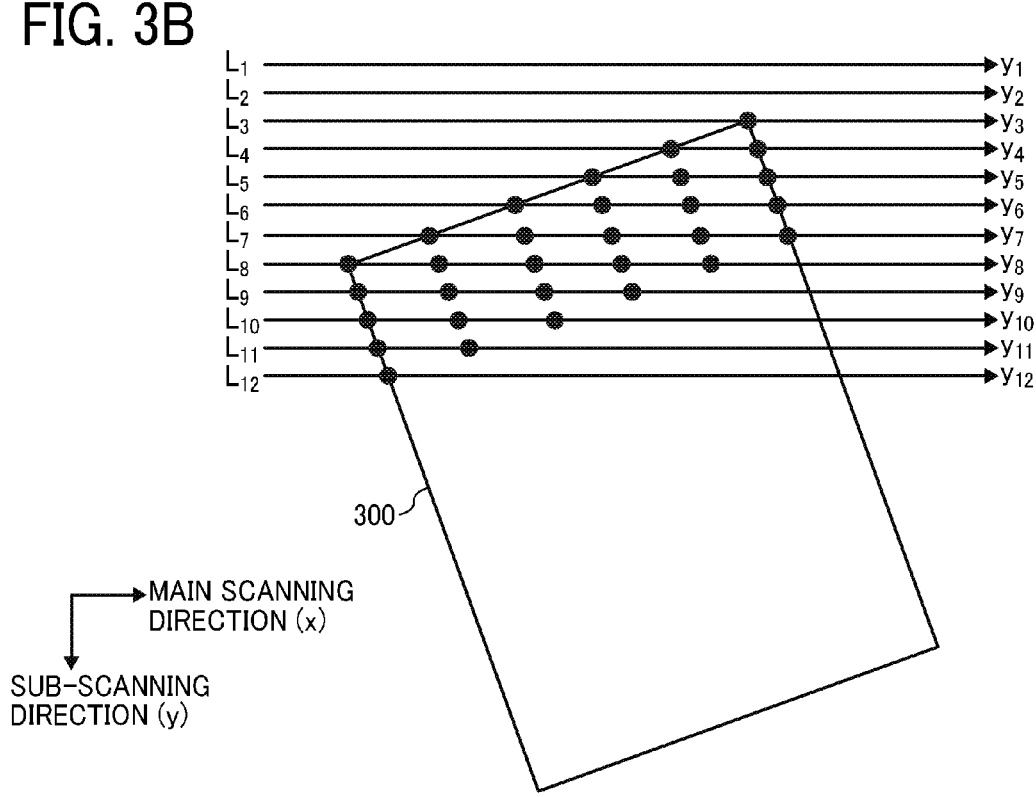

FIGS. 3A through 3F are diagrams illustrating various processes performed by the inclination corrector 200. FIGS. 3A and 3B illustrate an overview of a wiring process performed by the data writer 210 of the inclination corrector 200. In FIG. 3A, an arrow $L_1$ indicates a writing position in which image data of one scanning line in a main scanning direction is written in the DRAM 121. The image data used herein is acquired by scanning performed by an image sensor of the scanner unit 110 in the main scanning direction.

Similarly, each of arrows $L_2$ through $L_6$ in FIG. 3A indicates a writing position in which image data of one scanning line in the main scanning direction is written in the DRAM 121, the image data being acquired by the scanning performed by the image sensor of the scanner unit 110 in the main scanning direction. An original image 300 is conveyed in a direction indicated by an arrow 310 illustrated in FIG. 3A. Since such conveyance of the original image 300 moves a scanning position in which the image sensor of the scanner unit 110 performs scanning to a sub-scanning direction, a writing position is also moved to the sub-scanning direction.

According to the present exemplary embodiment, in the image area which is formed by sequentially writing the image data of one scanning line in the main scanning direction in the DRAM 121, a coordinate in the sub-scanning direction is set as a y coordinate (a y coordinate corresponds to one pixel (i.e., one line) in the image area). That is, the writing position indicated by the arrow $L_1$ is expressed by y coordinate=$y_1$ in the image area. Similarly, the writing positions indicated by the arrows $L_2$ through $L_6$ are respectively expressed by y coordinates=$y_2$ through $y_6$ in the image area.

In FIG. 3B, the writing process for wiring the image data in the DRAM 121 proceeds to writing positions indicated by arrows $L_1$ through $L_{12}$. In FIG. 3B, a black dot represents a pixel on the original image 300 acquired by the scanning performed by the image sensor of the scanner unit 110. As illustrated in FIG. 3B, when the writing process for wiring the image data in the DRAM 121 proceeds to the writing position indicated by the arrow $L_{12}$, it is determined that image data of five lines has been written in the DRAM 121 as an inclination-corrected original image area.

FIGS. 3C and 3D illustrate an overview of a reading process performed by the state detector 220 and the data reader 230 of the inclination corrector 200. Each of the state detector 220 and the data reader 230 sequentially reads image data line by line from the DRAM 121 at substantially the same time.

In an example illustrated in FIG. 3C, an arrow $L_1$ indicates that image data of one scanning line in a main scanning direction is read by the state detector 220 and the data reader 230, the image data having been written in the DRAM 121 by the data writer 210. Similarly, each of arrows $L_2$ through $L_4$ in FIG. 3C represents that image data of one scanning line in the main scanning direction is read by the state detector 220 and the data reader 230, the image data having been written in the DRAM 121 by the data writer 210.

In the example illustrated in FIG. 3C, the image data reading process performed by the state detector 220 and the data reader 230 is delayed by two lines relative to the image data wiring process performed by the data writer 210.

FIG. 3D illustrates a state in which the reading process in the main scanning direction by the state detector 220 and the data reader 230 has reached reading positions indicated by arrows $L_1$ through $L_{10}$. The reading positions indicated by the arrows $L_1$ through $L_{10}$ are respectively expressed as y coordinates=$y_1$ through $y_{10}$ in an image area.

Moreover, in the present exemplary embodiment, when reading the lines in the reading positions indicated by the respective arrows $L_1$ though $L_{10}$ (the lines in a range indicated by an arrow 330 illustrated in FIG. 3D), the state detector 220 detects corner information and calculates inclination data indicating inclination of the original image with respect to the main scanning direction. In the example illustrated in FIG. 3D, a corner $p_1$ has corner information (y coordinate) of $y_3$, and a corner $p_2$ has corner information (y coordinate) of $y_8$.

At this time, the state detector 220 notifies the data reader 230 of the corner information and the inclination data. Moreover, the state detector 220 notifies the data reader 230 of a correction start instruction.

In the example illustrated in FIG. 3D, a black dot represents a pixel in an original image area 320 of the image data read by the data reader 230. In the example illustrated in FIG. 3D, when the reading process performed by the state detector 220 proceeds to a reading position indicated by the arrow $L_{10}$, it is determined that image data of three lines has been read from the DRAM 121 as an inclination-corrected original image area.

Figure 3E:
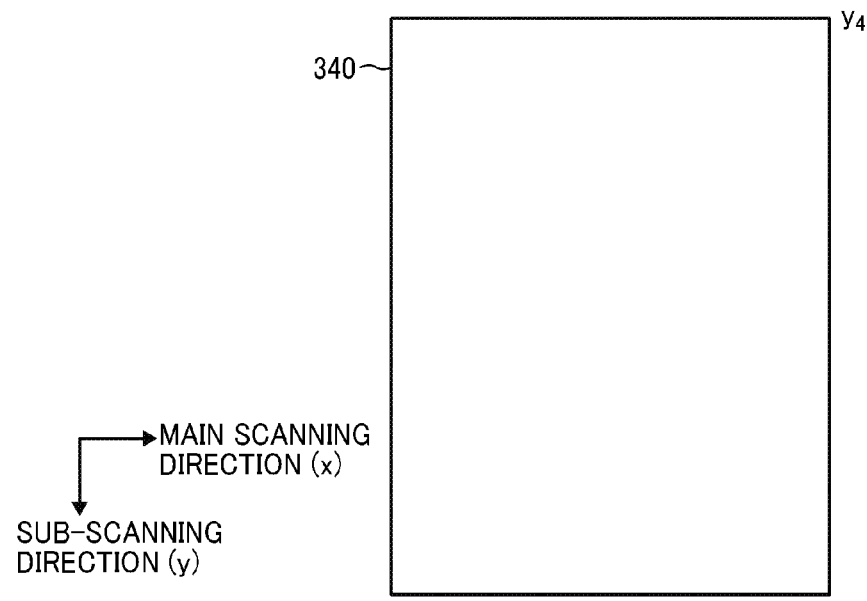
Figure 3F:
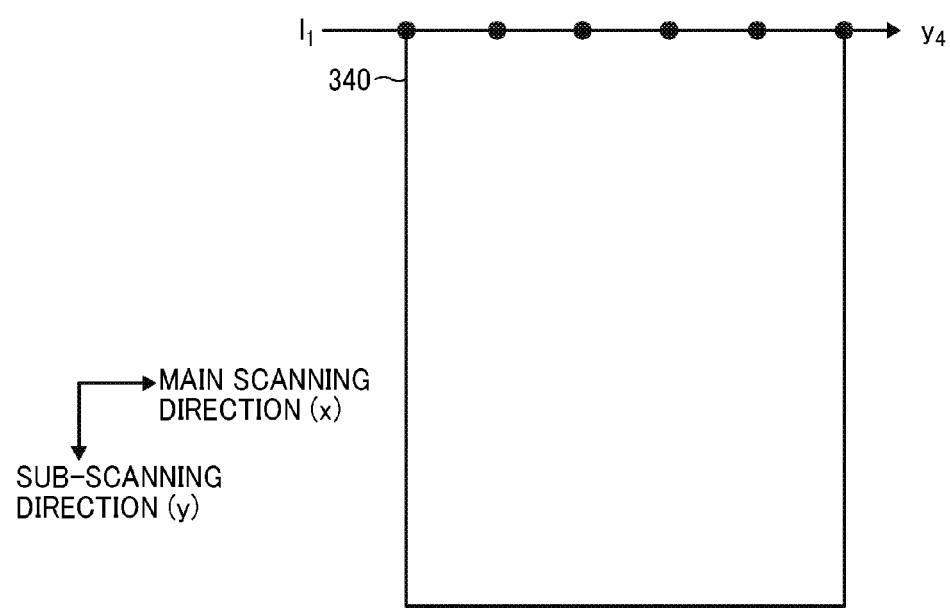

FIGS. 3E and 3F illustrate an overview of an inclination correction process performed by the data reader 230 of the inclination corrector 200. FIG. 3E illustrates a state in which a correction start instruction has not been notified by the state detector 220 and an inclination correction process has not been started. FIG. 3F illustrates a state in which each pixel extracted from an upper end position 321 of the original image area 320 illustrated in FIG. 3D is arranged in a position of y coordinate=$y_4$ by the inclination correction process performed by the data reader 230. The position in which each of the pixels extracted from the upper end position 321 is arranged subsequent to the inclination correction process is calculated based on the inclination data notified by the state detector 220 and a position coordinate of a rotation center used when the original image area 320 is rotated at the inclination correction process. Thus, at the state illustrated in FIG. 3E, the position in which each of the pixels extracted from the upper end position 321 of the original image area 320 illustrated in FIG. 3D is to be arranged by the inclination correction process has not been determined in a precise sense. In the present exemplary embodiment, the rotation center is a position coordinate that is fixed beforehand.

FIG. 3F illustrates a state in which a correction start instruction is notified by the state detector 220 and the inclination correction process is started by the data reader 230. In the example illustrated in FIG. 3F, the data reader 230 extracts a pixel (see a black dot) of the upper end position 321 illustrated in FIG. 3D of the original image area 320 to arrange the extracted pixel in a position of y coordinate=$y_4$, so that a line $l_1$ is formed as an inclination-corrected original image area 340.

<4. Restrictive Condition on Inclination Correction Process>

Next, a description is given of a restrictive condition on progress of the inclination correction process performed by the inclination corrector 200. As described above, the data reader 230 sets the restrictive condition on progress of the inclination correction process such that there is no mismatch between the inclination correction process and each of a writing process for wiring image data in the DRAM 121 and a reading process for reading image data from the DRAM 121.

Figure 4A:
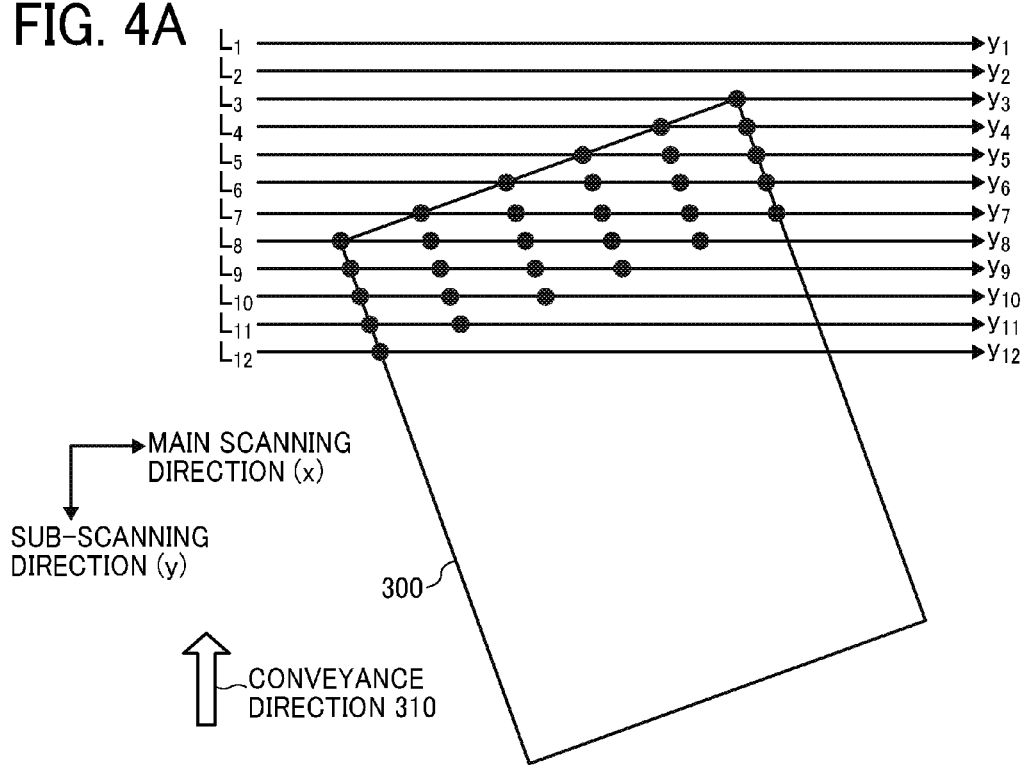
Figure 4B:
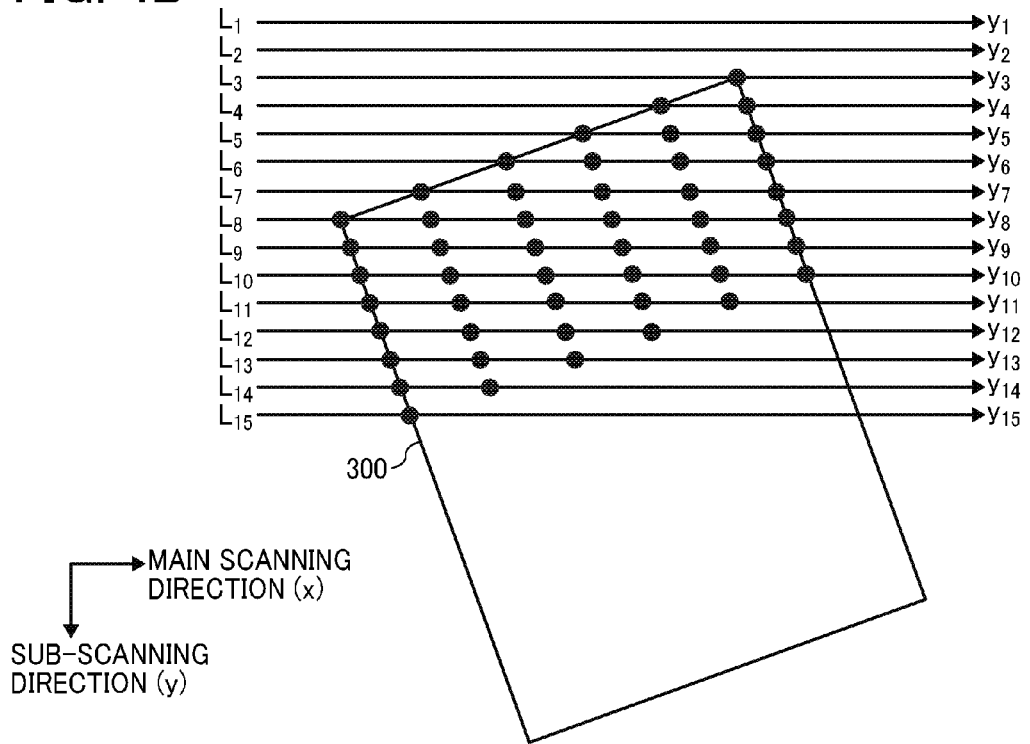

FIGS. 4A through 4F are diagrams illustrating the restrictive condition on progress of the inclination correction process. FIGS. 4A and 4B illustrate an overview of the writing process performed by the data writer 210 of the inclination corrector 200, and a state illustrated in FIG. 4A is substantially the same as a state illustrated in FIG. 3B.

FIG. 4B illustrates a state in which the writing process for writing image data in the DRAM 121 has proceeded to writing positions indicated by arrows $L_1$ through $L_{15}$. In FIG. 4B, a black dot indicates a pixel in the original image 300 acquired by the scanning performed by the image sensor of the scanner unit 110. In the example illustrated in FIG. 4B, when the writing process is performed up to the writing position indicated by the arrow $L_{15}$, it is determined that image data of eight lines has been written in the DRAM 121 as an inclination-corrected original image data area.

FIGS. 4C and 4D illustrate an overview of the reading process performed by the data reader 230 of the inclination corrector 200. FIG. 4C illustrates a state that is substantially the same as a state illustrated FIG. 3D. The reading process performed by the state detector 220 stops when calculation of inclination data and corner information is completed. Only the reading process performed by the data reader 230 continues after the reading process by the state detector 220 stops.

FIG. 4D illustrates a state in which the reading process by the data reader 230 has proceeded to reading positions indicated by the arrows $L_1$ through $L_{13}$. Moreover, in FIG. 4D, a black dot indicates a pixel in the original image area 320 acquired by the reading process performed by the state detector 220. In the example illustrated in FIG. 4D, when the reading process is performed up to the reading position indicated by the arrow $L_{13}$, it is determined that image data of six lines has been read from the DRAM 121 as an inclination-corrected original image area.

Figure 4E:
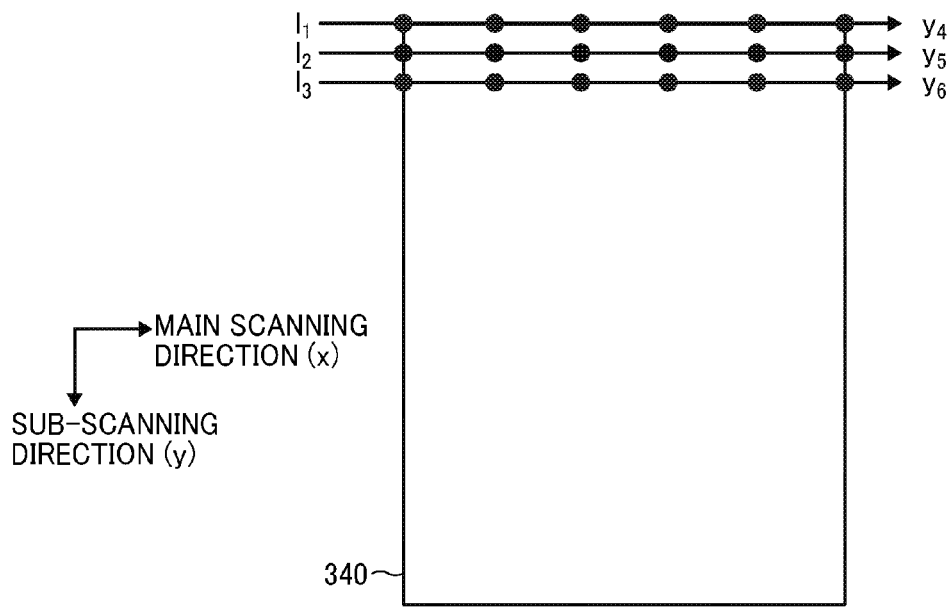
Figure 4F:
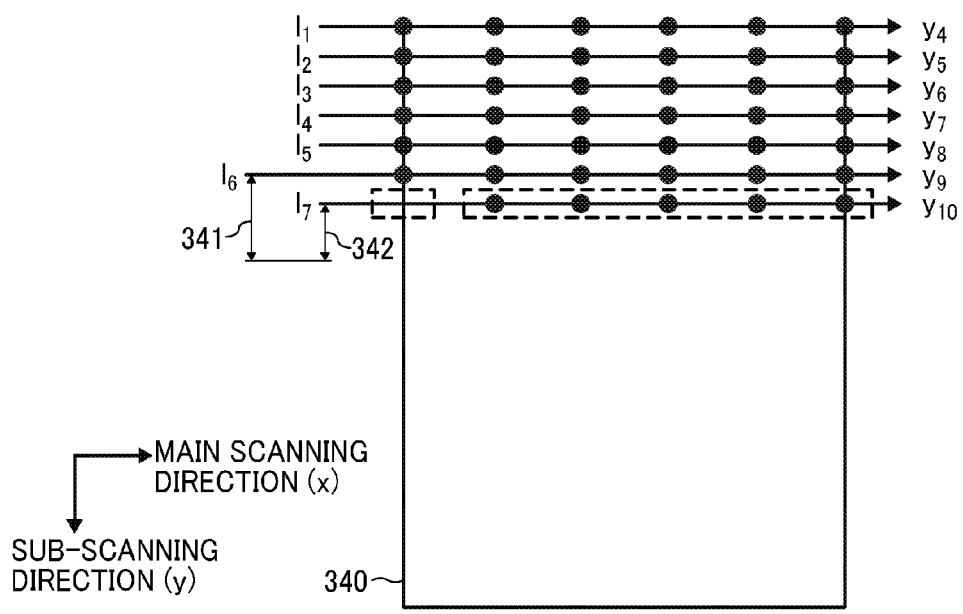

FIGS. 4E and 4F illustrate an overview of the inclination correction process performed by the data reader 230 of the inclination corrector 200. FIG. 4E illustrates a state in which the data reader 230 has formed lines $l_1$ through $l_3$ in respective positions of y-coordinates=$y_4$ through $y_6$ as the inclination-corrected original image area 340.

As mentioned above, the cycle of the inclination correction process performed by the data reader 230 is shorter than the cycle of the writing process for writing image data in the DRAM 121 and the cycle of the reading process for reading image data from the DRAM 121. Accordingly, in FIG. 4E, the lines $l_1$ through $l_3$ are formed as the inclination-corrected original image area 340 (the number of lines in FIG. 4E is greater than the number of lines in FIG. 3F).

FIG. 4F illustrates a state in which the inclination correction process performed by the data reader 230 has proceeded to a line $l_7$. Moreover, in FIG. 4F, a black dot represents a pixel that is extracted from the image data read from the DRAM 121 by the data reader 230 and arranged in the inclination-corrected original image area 340.

Herein, although there is a plurality of pixels in the line $l_7$, no pixel is provided in the left end of the original image area 340 as illustrated in FIG. 4F. Such a state occurs, since the writing process by the data writer 210 has proceeded to only the writing position indicated by the arrow $L_{15}$ illustrated in FIG. 4B, and the reading process by the data reader 230 has proceeded to only the reading position indicated by the arrow $L_{13}$ illustrated in FIG. 4D.

In other words, when the reading process by the data reader 230 has proceeded to only the reading position indicated by the arrow $L_{13}$, the data reader 230 can execute the inclination correction process up to a line $l_6$. Thus, the data reader 230 according to the present exemplary embodiment controls a difference between the current reading position and an inclination correction position such that the difference is greater than or equal to a difference indicated by an arrow 341 illustrated in FIG. 4F. If the difference is less than or equal to a difference indicated by an arrow 342 illustrated in FIG. 4F, the data reader 230 performs a control operation such that the inclination correction process temporarily stops.

Therefore, the data reader 230 controls progress of the inclination correction process according to progress of the reading process determined with progress of the writing process. A restrictive condition herein can be calculated based on a difference between a position coordinate (y coordinate=$y_8$) of a corner $p_2$ in corner information and a position coordinate (y coordinate=$y_4$) of an upper end of the original image area 340 generated by the inclination correction process.

The position coordinate (y coordinate=$y_4$) of the upper end of the original image area 340 can be calculated based on the inclination data and a position coordinate of the rotation center. Hereinafter, a method for calculating the restrictive condition is described in detail.

<5. Restrictive Condition Calculation Method>

Figure 5A:
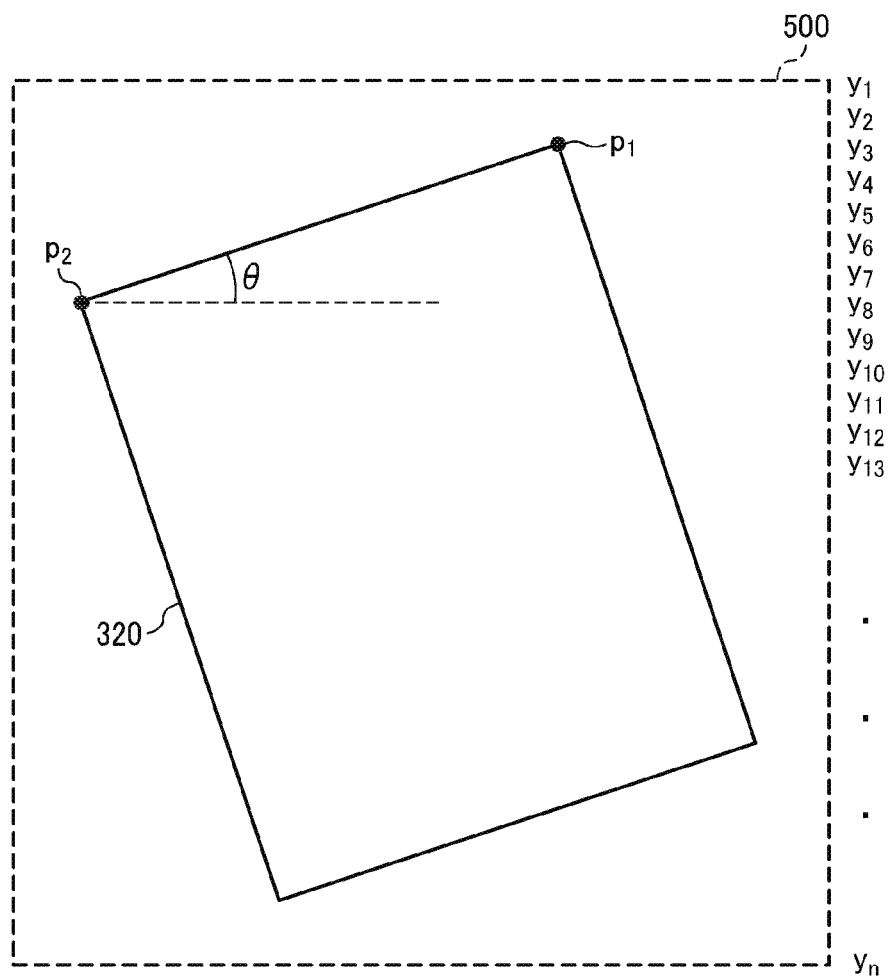
FIGS. 5A and 5B are diagrams illustrating one example of a restrictive condition calculation method.
Figure 5B:
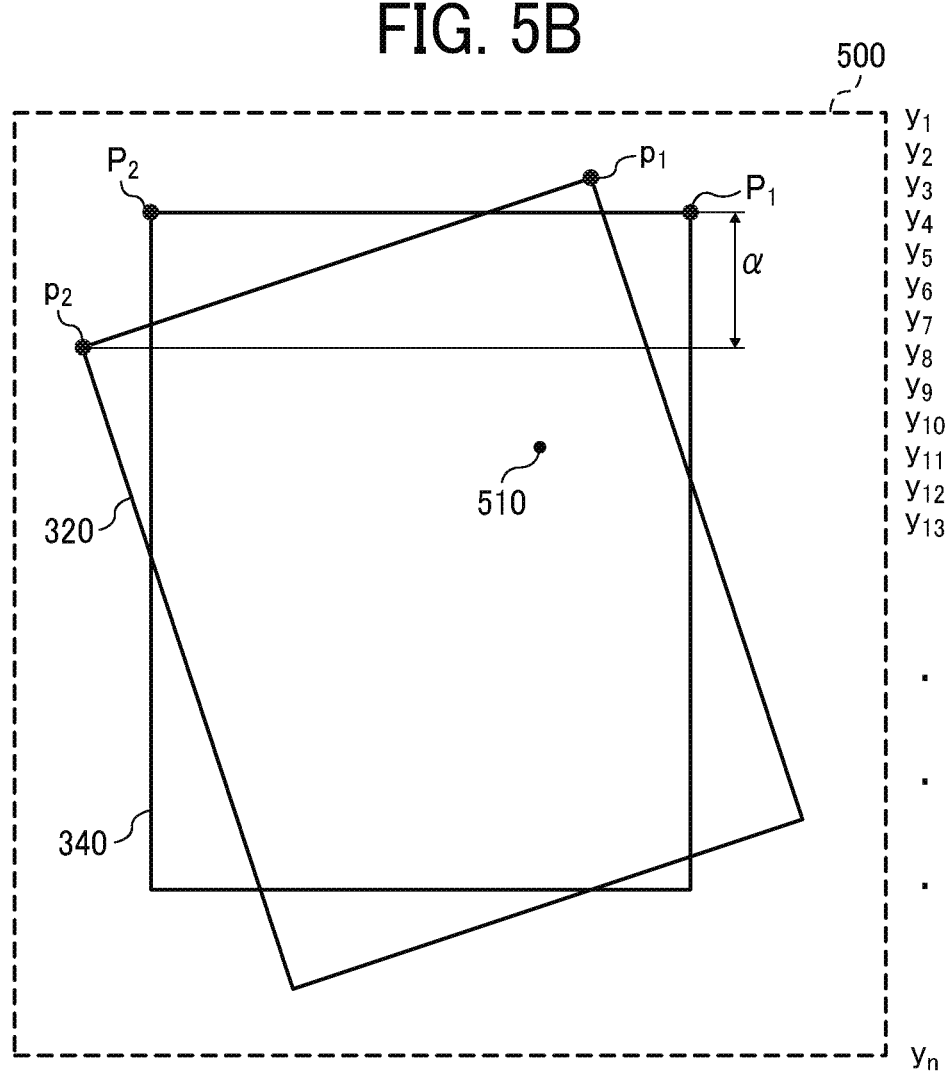

FIGS. 5A and 5B are diagrams illustrating one example of a restrictive condition calculation method. FIG. 5A illustrates a calculation method by which the state detector 220 calculates inclination data θ in an image area 500 based on corner information. The state detector 220 detects two corners $p_1$ and $p_2$ (right and left corners on a leading end side of the original image 300 in a conveyance direction) of the original image area 320 based on the image data read from the DRAM 121. Subsequently, the state detector 220 calculates inclination data θ of the original image area 320 with respect to the main scanning direction based on coordinates of the two detected corners $p_1$ and $p_2$ (right and left corners) in an image area 500.

FIG. 5B illustrates a relation between before and after the data reader 230 performs the inclination correction process based on the inclination data θ. As illustrated in FIG. 5B, the original image area 320 is rotated by an angle corresponding to the inclination data θ around a predetermined rotation center 510. Such rotation corrects the inclination of the original image area 320, and the two corners $p_1$ and $p_2$ are respectively moved to corners $P_1$ and $P_2$.

Herein, if coordinates of the two corners $p_1$ and $p_2$ are respectively set to $(x_1, y_3)$ and $(x_2, y_8)$, and coordinates of the corners $P_1$ and $P_2$ are respectively set to $(x_3, y_4)$ and $(x_4, y_4)$, a relation between the coordinates of the corners $p_1$ and $p_2$ and the coordinates of the corners $P_1$ and $P_2$ can be calculated by Expressions 1 and 2 below.

$$\begin{pmatrix} x \text{ coordinate of } P_1 \\ y \text{ coordinate of } P_1 \end{pmatrix} = \begin{pmatrix} \cos\theta & -1 \times \sin\theta \\ \sin\theta & \cos\theta \end{pmatrix} \begin{pmatrix} x \text{ coordinate of } p_1 \\ y \text{ coordinate of } p_1 \end{pmatrix} \quad \text{[Expression 1]}$$

$$\begin{pmatrix} x \text{ coordinate of } P_2 \\ y \text{ coordinate of } P_2 \end{pmatrix} = \begin{pmatrix} \cos\theta & -1 \times \sin\theta \\ \sin\theta & \cos\theta \end{pmatrix} \begin{pmatrix} x \text{ coordinate of } p_2 \\ y \text{ coordinate of } p_2 \end{pmatrix} \quad \text{[Expression 2]}$$

As described above, since the restrictive condition is calculated based on a difference (an amount of movement of the left corner $p_2$ in the sub-scanning direction) between a position coordinate (y coordinate) of the corner $P_1$ or $P_2$ and a position coordinate (y coordinate) of the left corner $p_2$, a restrictive condition $\alpha=y_4-y_8$. That is, in the example illustrated in FIG. 5B, a restrictive condition $\alpha=4$ lines.

<6. Functional Configuration of Data Reader>

Next, one example of a functional configuration of the data reader 230 is described with reference to FIG. 6.

Figure 6:
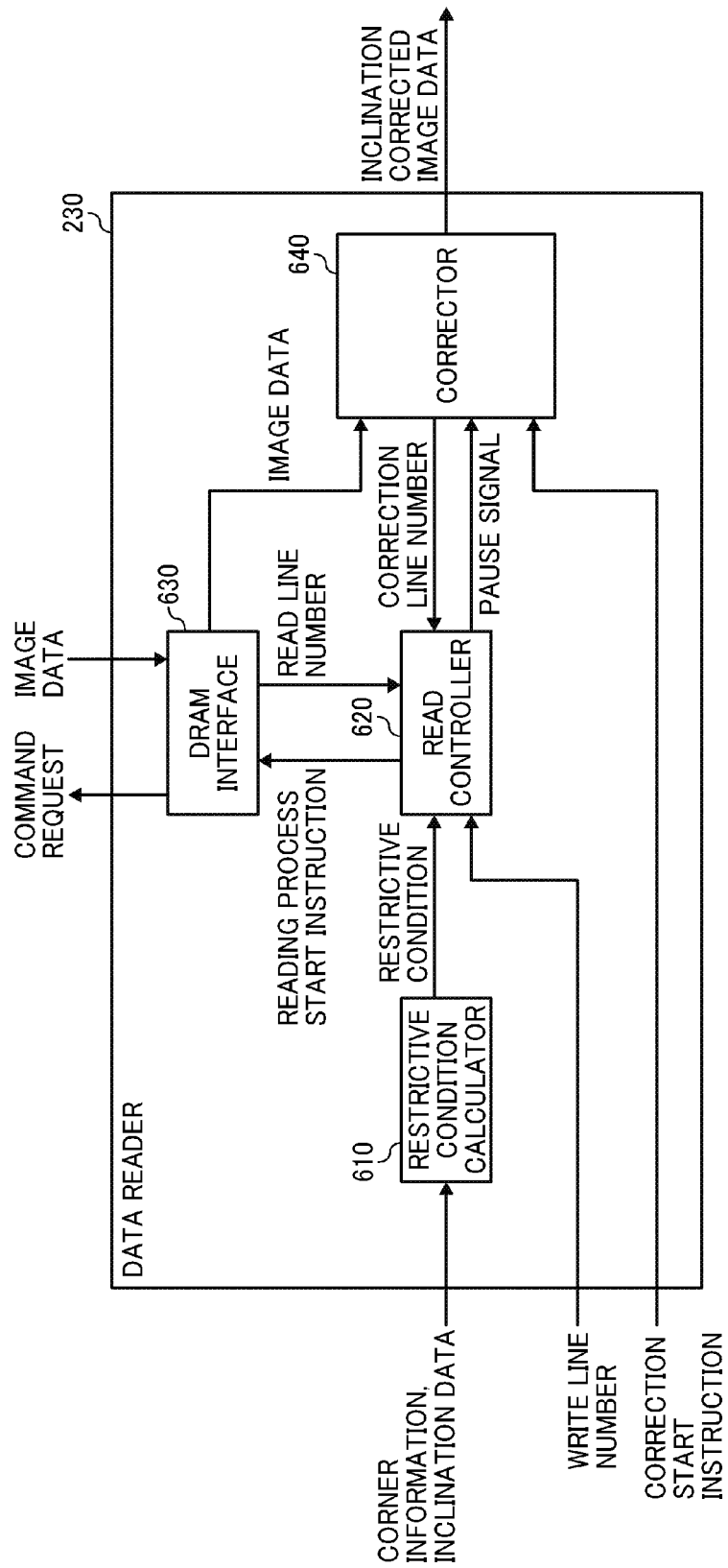
FIG. 6 is a diagram illustrating one example of a functional configuration of a data reader.

As illustrated in FIG. 6, the data reader 230 includes a restrictive condition calculator 610, a read controller 620, a DRAM interface 630, and a corrector 640. The restrictive condition calculator 610 is one example of a calculation circuit. The restrictive condition calculator 610 calculates a restrictive condition α upon receipt of the corner information and the inclination data θ from the state detector 220. The restrictive condition calculator 610 notifies the read controller 620 of the calculated restrictive condition α.

The read controller 620 notifies the DRAM interface 630 of a reading process start instruction upon receipt of the notification indicating a write line number from the data writer 210. Moreover, the read controller 620 compares a line number being read (a read line number) notified by the DRAM interface 630 with a line number being in the inclination correction process (a correction line number) notified by the corrector 640 to determine whether the comparison result is less than the restrictive condition α. Moreover, if the comparison result is less than the restrictive condition α, the read controller 620 notifies the corrector 640 of a pause signal.

The DRAM interface 630 transmits a command request to the DRAM 121, and reads image data of each line upon receipt of the reading process start instruction from the read controller 620. The DRAM interface 630 notifies the corrector 640 of the read image data. Moreover, the DRAM interface 630 notifies the read controller 620 of a read line number.

The corrector 640 receives the image data from the DRAM interface 630. Moreover, the corrector 640 starts an inclination correction process on the image data notified by the DRAM interface 630 upon receipt of the correction start instruction from the state detector 220. The operations of the corrector 640 described herein are merely examples.

The corrector 640 notifies the read controller 620 of a correction line number. The corrector 640 temporarily stops the inclination correction process upon receipt of the pause signal from the read controller 620. Moreover, when the pause signal is cancelled, the corrector 640 resumes the inclination correction process. The corrector 640 outputs inclination-corrected image data that is generated by the inclination correction process.

<7. Inclination Correction Process Performed by Inclination Corrector>

Figure 7:
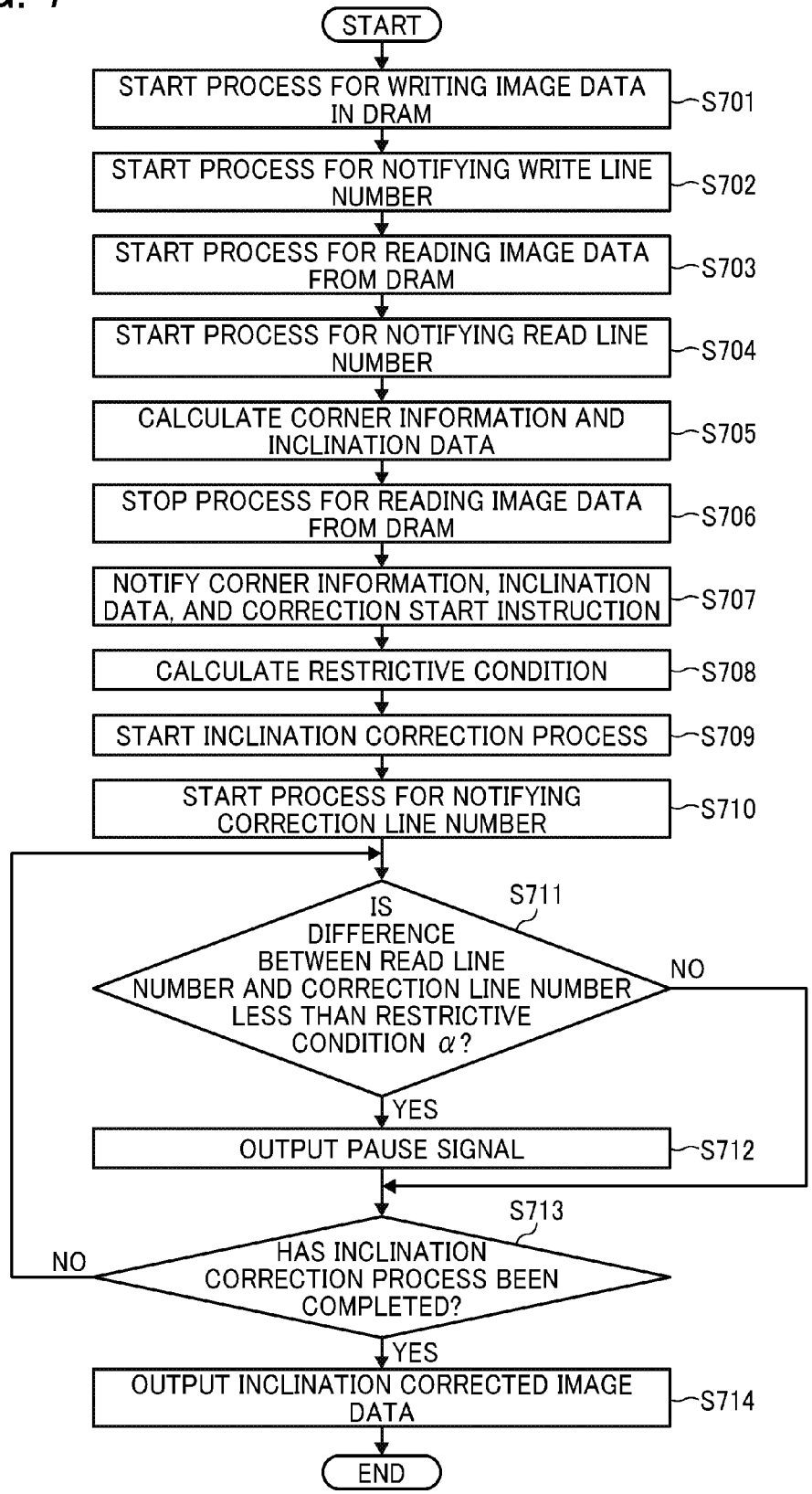
FIG. 7 is a flowchart illustrating the inclination correction process.

Next, an inclination correction process performed by the inclination corrector 200 is described with reference to a flowchart illustrated in FIG. 7. When the scanner unit 110 transmits image data, the inclination corrector 200 starts the inclination correction process illustrated in FIG. 7.

In step S701, the data writer 210 starts a writing process by which image data is written in the DRAM 121 for each scanning line in the main scanning direction.

In step S702, the data writer 210 starts a process for notifying the data reader 230 of a write line number indicating a line being written in the DRAM 121.

In step S703, each of the state detector 220 and the data reader 230 starts a reading process by which image data is sequentially read from the DRAM 121 line by line.

In step S704, the DRAM interface 630 of the data reader 230 starts a process for notifying the read controller 620 of a read line number (y coordinate).

In step S705, the state detector 220 calculates corner information and inclination data based on the image data of the predetermined number of lines (e.g., image data of a line in each of reading positions indicated by respective arrows $L_1$ through $L_{10}$).

When the state detector 220 completes the calculation of the corner information and the inclination data based on the image data of the predetermined line numbers, the operation proceeds to step S706 in which the state detector 220 stops the image data reading process.

Subsequently, in step S707, the state detector 220 notifies the data reader 230 of the corner information, the inclination data, and a correction start instruction.

In step S708, the restrictive condition calculator 610 of the data reader 230 calculates a restrictive condition based on the corner information and the inclination data notified by the state detector 220.

In step S709, the corrector 640 of the data reader 230, based on the correction start instruction from the state detector 220, starts an inclination correction process on the image data sequentially read from the DRAM 121 line by line.

In step S710, the corrector 640 of the data reader 230 starts a process for notifying the read controller 620 of a correction line number (y coordinate).

In the step S711, the read controller 620 of the data reader 230 determines whether a difference between the read line number (y coordinate) and the inclination correction line number (y coordinate) is less than a restrictive condition α.

If the difference is less than the restrictive condition α (YES in step S711), the operation proceeds to step S712 in which the read controller 620 transmits a pause signal to the corrector 640. On the other hand, if the difference is greater than or equal to the restrictive condition α (NO in step S711), the operation proceeds to step S713.

In step S713, the corrector 640 of the data reader 230 determines whether the inclination correction process has been finished. If the inclination correction process has not been finished (NO in step S713), the operation returns to step S711. On the other hand, if the inclination process has been finished (YES in step S713), the operation proceeds to step S714. In step S714, the corrector 640 outputs inclination-corrected image data generated by the inclination correction process (image data of the original image area 340).

<8. Timing Chart of Inclination Correction Process>

Next, one example of a timing chart of the inclination correction process is described with reference to FIG. 8.

In FIG. 8, a read line synchronization signal 81( )indicates a signal for reading each line of image data from the DRAM 121 in a reading process, and each of times 811 through 817 represents a time when image data is read. As illustrated in FIG. 8, each line of the image data is read from the DRAM 121 at a constant cycle.

A read line 820 indicates lines that are respectively read at the times 811 through 817.

A correction start instruction signal 830 indicates a signal of a correction start instruction transmitted from the state detector 220 to the data reader 230, and a time 831 indicates a time at which the correction start instruction signal 830 is transmitted.

A correction line synchronization signal 840 indicates a signal for an inclination correction process preformed on image data of each read line. Each of times 841, 843, 844, 845, 846, and 848 indicates a time when the inclination correction process is performed. An inclination correction process cycle is shorter than the reading cycle. However, since the inclination correction process temporarily stops if the aforementioned difference is less than the restrictive condition α, the inclination correction process cycle is not constant.

A correction line 850 indicates a line that has undergone the inclination correction process. A pause signal 860 indicates a pause signal transmitted from the read controller 620 to the corrector 640, and a time 861 indicates a time when the pause signal is transmitted.

In FIG. 8, the restrictive condition α is four lines (the restrictive condition α=4 lines) based on calculation. If a difference line (a y-coordinate difference) that is a difference between a read line number (y coordinate) and a correction line number (y coordinate) is less than four lines, a pause signal is output to the corrector 640.

In FIG. 8, for example, at the times 813 through 816 of the correction line synchronization signal 840, the read line 820 indicates lines $L_{10}$ through $L_{13}$ (y coordinates=$y_{10}$ through $y_{13}$), whereas the correction line 850 indicates lines $l_1$ through $l_6$ (y coordinates=$y_4$ through $y_9$). Thus, any difference line (a y-coordinate difference) is greater than or equal to four lines, and the correction lines $l_1$ through $l_6$ are formed in respective positions of y coordinates=$y_4$ through $y_9$.

On the other hand, at a time 847 of the correction line synchronization signal 840, the read line 820 remains in the line $L_{13}$ (y coordinate=$y_{13}$), whereas the correction line 850 indicates a line $l_7$ (y coordinate=$y_{10}$). Thus, a difference line (a y-coordinate difference) is three lines (which is less than the restrictive condition (α=4)), and the pause signal 860 is output at the time 861. As a result, the next correction line $l_7$ is not formed at the time 847 of the correction line synchronization signal 840.

However, at a time 848 of the correction line synchronization signal 840, the read line 820 indicates a line $L_{14}$ (y coordinate=$y_{14}$) and the correction line 850 indicates the line $l_7$ (y coordinate=$y_{10}$). That is, a difference line (a y-coordinate difference) is four lines (equal to or greater than the restrictive condition (α=4)) again. Hence, the correction line $l_7$ is formed in a position of y coordinate=$y_{10}$.

<9. Summary>

Therefore, the image processing apparatus of the present exemplary embodiment can provide following points. The image processing apparatus reads image data line by line, and calculates a restrictive condition with respect to the read image data such that there is no mismatch between a reading process and an inclination correction process when the inclination correction process is performed. The image processing apparatus calculates the restrictive condition based on an amount of movement in a sub-scanning direction of a predetermined corner before and after the correction of the original image. The image processing apparatus restricts progress of the inclination correction process if a difference between a reading position at a reading process and a correction position at the inclination correction process is less than the restrictive condition.

Therefore, even if the inclination correction process is performed at a high speed, the image processing apparatus can appropriately generate inclination-corrected image data.

Second Embodiment

The first exemplary embodiment has been described using an example of a restrictive condition calculation method when an original image is inclined counterclockwise. However, an original image may be inclined clockwise.

Figure 9A:
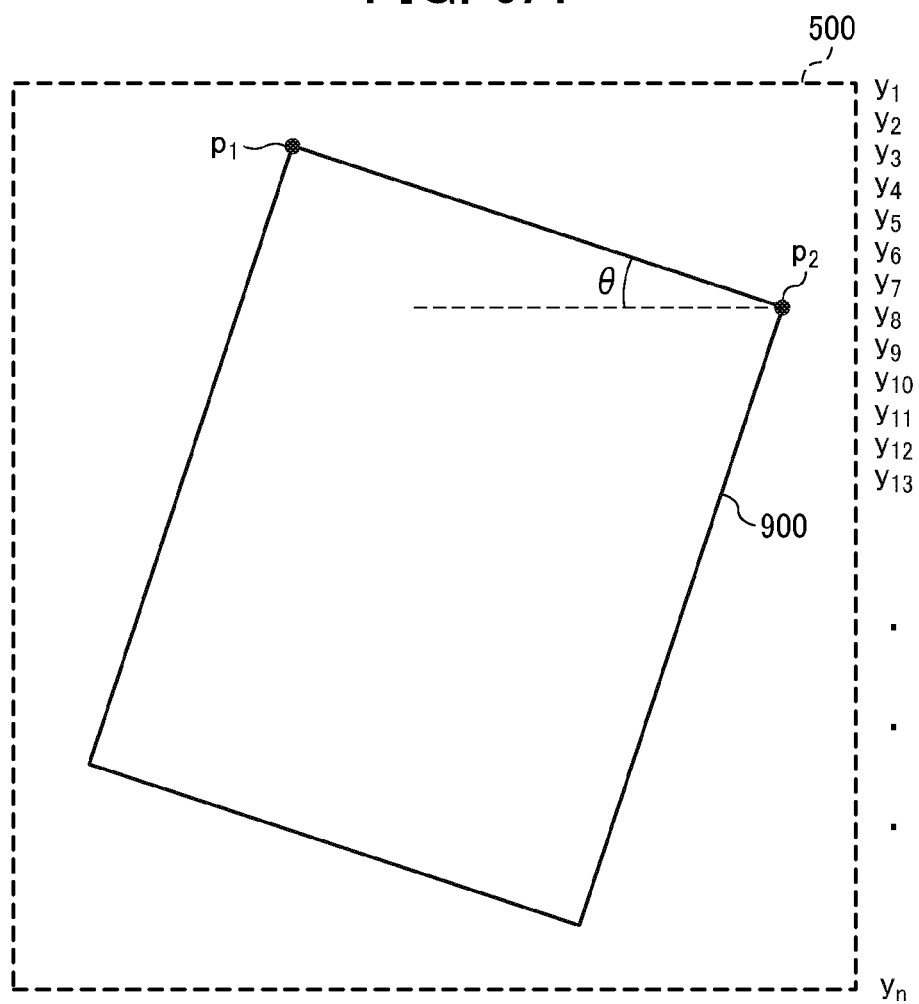
FIGS. 9A and 9B are diagrams illustrating another example of a restrictive condition calculation method.
Figure 9B:
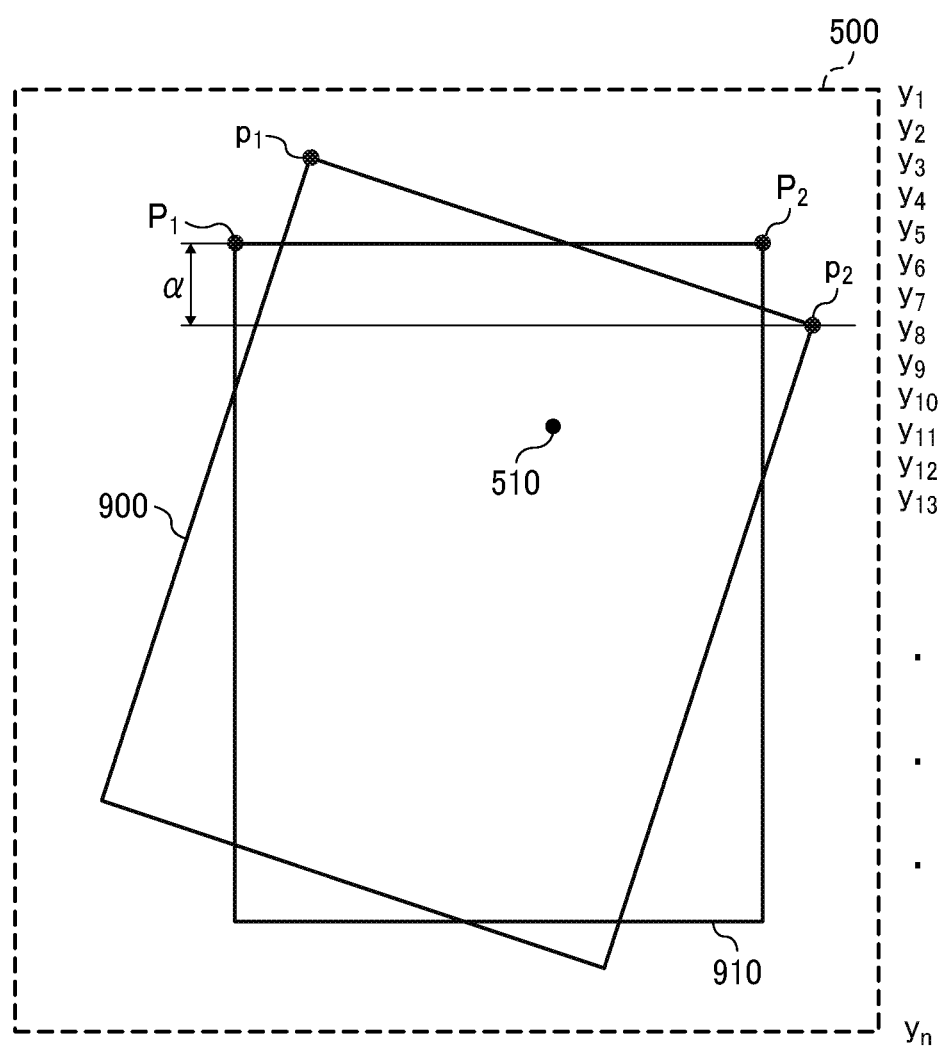

FIGS. 9A and 9B are diagrams illustrating another example of the restrictive condition calculation method.

FIGS. 9A and 9B illustrate a calculation method by which a state detector 220 calculates inclination data θ in an image area 500 based on corner information. The state detector 220 detects two corners $p_1$ and $p_2$ (left and right corners on a leading end side of an original image 300 in a conveyance direction) of an original image area 900 based on image data read from a DRAM 121. Then, the state detector 220 calculates the inclination data θ of the original image area 900 with respect to a main scanning direction based on coordinates of the two detected corners $p_1$ and $p_2$ in the image area 500.

FIG. 9B is a diagram illustrates a relation between before and after a data reader 230 performs an inclination correction process based on the inclination data θ. As illustrated in FIG. 9B, the original image area 900 is rotated by an angle corresponding to the inclination data θ around a predetermined rotation center 510. Such rotation corrects inclination of the original image area 900, and the two corners $p_1$ and $p_2$ are respectively moved to corners $P_1$ and $P_2$.

Herein, if coordinates of the two corners $p_1$ and $p_2$ are respectively set to $(x_1, y_3)$ and $(x_2, y_8)$, coordinates of the corners $P_1$ and $P_2$ can be respectively calculated to $(x_3, y_5)$ and $(x_4, y_5)$ based on the above-described Expressions 1 and 2. Since a restrictive condition is calculated from a difference (an amount of movement of the right corner $p_2$ in a sub-scanning direction) between a position coordinate (y coordinate) of the corner $P_1$ or $P_2$ and a position coordinate (y coordinate) of the right corner $p_2$, a restrictive condition β=$y_5$−$y_8$. That is, in the example illustrated in FIG. 9B, a restrictive condition α=3 lines.

Accordingly, even if an original image is inclined clockwise, a restrictive condition α can be calculated, and the calculated restrictive condition α can be used for an inclination correction process. Thus, as similar to the above exemplary embodiment, even if the inclination correction process is performed at a high speed, the image processing apparatus can appropriately generate inclination-corrected image data (image data of an original image area 910).

Other Embodiments

In each of the first and second exemplary embodiments, a restrictive condition α is defined as a difference between a reading position and a correction position, and a difference between a read line number and a correction line number is monitored. However, a relation between a write line number and the read line number may be defined beforehand. In such a case, a restrictive condition α can be defined as a difference between a writing position and a correction position, and a difference between the write line number and the correction line number can be monitored.

Moreover, in each of the first and second exemplary embodiments, a restrictive condition is arranged for a high-speed inclination correction process to prevent delay in reading of a pixel to be used for formation of a correction line. However, an advantage of the restrictive condition is not limited thereto. For example, arrangement of the restrictive condition enables an original image area 340 or 910 having a correct length in a sub-scanning direction to be output.

Moreover, in each of the first and second exemplary embodiments, the state detector 220 calculates inclination data based on the image data read from the DRAM 121. However, an inclination detection sensor may be disposed in a reading position in which an image sensor is disposed. In such a case, the inclination detection sensor detects inclination data.

Moreover, in each of the first and second exemplary embodiments, an image sensor of the scanner unit 110 is disposed in a reading position, and conveyance of an original image moves the original image in a sub-scanning direction with respect to the image sensor. However, the configuration for relatively moving the original image in the sub-scanning direction with respect to the image sensor is not limited thereto. For example, a position of an original image can be fixed, and an image sensor can be moved in a sub-scanning direction with respect to the original image.

Moreover, each of the first and second exemplary embodiments has been described using an example case in which the image forming apparatus 100 includes the scanner unit 110, the image processing board 120, and the printer unit 130. That is, the image forming apparatus 100 has a scanner function and a copy function (a scanner function and a printer function). However, the image forming apparatus 100 does not necessarily include the printer unit 130. That is, the image forming apparatus 100 can simply include a scanner function, and display, store, or transmit inclination-corrected image data.

Moreover, the first exemplary embodiment has been described using an example case in which the inclination corrector 200 operates on an integrated circuit. However, a storage medium in which a software program code (an image processing program code) for performing a function of the inclination corrector 200 is recorded may be supplied to an image processing apparatus. In such a case, a computer of the image processing apparatus reads the program code recorded in the storage medium to execute the program code, thereby performing a function of the inclination corrector 200.

The present disclosure has been described above with reference to specific exemplary embodiments but is not limited thereto. Various modifications and enhancements are possible without departing from scope of the disclosure. It is therefore to be understood that the present disclosure may be practiced otherwise than as specifically described herein. For example, elements and/or features of different illustrative exemplary embodiments may be combined with each other and/or substituted for each other within the scope of the present disclosure.

What is claimed is:

1. An image processing apparatus comprising:
a memory to store image data of an original image moved in a sub-scanning direction with respect to an image sensor that scans the original image in a main scanning direction to generate the image data;
a correction circuit to sequentially read the image data from the memory line by line in the main scanning direction, extract a pixel in a position corresponding to an inclination of the original image with respect to the main scanning direction, and form an inclination-corrected line in the main scanning direction to correct the inclination of the original image; and
a calculation circuit to calculate an amount of movement of a corner of the original image with respect to the sub-scanning direction before and after correction of the inclination of the original image with respect to the main scanning direction by the correction circuit, the amount of movement being applied when the inclination of the original image is corrected,
the correction circuit being configured to stop formation of the inclination-corrected line in the main scanning direction upon a difference between a position in the sub-scanning direction, when the image data is sequentially read line by line in the main scanning direction, and a position in the sub-scanning direction, when the inclination-corrected line in the main scanning direction is formed, is relatively smaller than the amount of movement.

2. The image processing apparatus according to claim 1, wherein the correction circuit forms the inclination-corrected line in the main scanning direction at a cycle shorter than a cycle in which the correction circuit sequentially reads the image data line by line in the main scanning direction.

3. The image processing apparatus according to claim 1, wherein the calculation circuit calculates the inclination of the original image with respect to the main scanning direction based on the image data.

4. The image processing apparatus according to claim 1, wherein the calculation circuit is configured to calculate an amount of movement of a left corner of the original image with respect to the sub-scanning direction, before and after the correction of the inclination, upon the image data being rotated clockwise to correct the inclination, and is configured to calculate an amount of movement of a right corner of the original image with respect to the sub-scanning direction, before and after the correction of the inclination, upon, the image data being rotated counterclockwise to correct the inclination.

5. An image forming apparatus comprising the image processing apparatus according to claim 1 to output the image data after the correction of the inclination.

6. The image processing apparatus according to claim 1, wherein the correction circuit is configured to restrict progress of formation of the inclination-corrected line in the main scanning direction based on the amount of movement.

7. An image processing method comprising:
 storing image data of an original image moved in a sub-scanning direction with respect to an image sensor that scans the original image in a main scanning direction to generate the image data;
 correcting an inclination of the original image with respect to the main scanning direction,
 the correcting including:
  sequentially reading the image data from a memory line by line in the main scanning direction;
  extracting a pixel in a position corresponding to the inclination; and
  forming an inclination-corrected line in the main scanning direction; and
 calculating an amount of movement of a corner of the original image with respect to the sub-scanning direction before and after the correcting of the inclination of the original image with respect to the main scanning direction, the amount of movement being applied when the inclination of the original image is corrected,
 the correcting stopping formation of the inclination-corrected line in the main scanning direction upon a difference between a position in the sub-scanning direction, when the image data is sequentially read line by line in the main scanning direction, and a position in the sub-scanning direction, when the inclination-corrected line in the main scanning direction is formed, is relatively smaller than the amount of movement.

8. The image processing method according to claim 7, wherein the correcting includes restricting progress of formation of the inclination-corrected line in the main scanning direction based on the amount of movement.

9. The image processing method according to claim 7, wherein the correcting includes forming the inclination-corrected line in the main scanning direction at a cycle shorter than a cycle in which the image data is sequentially read line by line in the main scanning direction.

10. The image processing method according to claim 7, wherein the calculating includes calculating the inclination of the original image with respect to the main scanning direction based on the image data.

11. The image processing method according to claim 7, wherein the calculating includes calculating an amount of movement of a left corner of the original image with respect to the sub-scanning direction, before and after correction of the inclination, upon the image data being rotated clockwise to correct the inclination, and includes calculating an amount of movement of a right corner of the original image with respect to the sub-scanning direction, before and after the correction of the inclination, upon the image data is being rotated counterclockwise to correct the inclination.

12. A non-transitory recording medium storing image processing program code that causes a computer to execute an image processing method, the method comprising:
 storing image data of an original image moved in a sub-scanning direction with respect to an image sensor that scans the original image in a main scanning direction to generate the image data;
 correcting an inclination of the original image with respect to the main scanning direction,
 the correcting including:
  sequentially reading the image data from a memory line by line in the main scanning direction;
  extracting a pixel in a position corresponding to the inclination; and
  forming an inclination-corrected line in the main scanning direction; and
 calculating an amount of movement of a corner of the original image with respect to the sub-scanning direction before and after the correcting of the inclination of the original image with respect to the main scanning direction, the amount of movement being applied when the inclination of the original image is corrected
 the correcting stopping formation of the inclination-corrected line in the main scanning direction upon a difference between a position in the sub-scanning direction, when the image data is sequentially read line by line in the main scanning direction, and a position in the sub-scanning direction, when the inclination-corrected line in the main scanning direction is formed, is relatively smaller than the amount of movement.

13. The non-transitory recording medium according to claim 12, wherein the correcting includes restricting progress of formation of the inclination-corrected line in the main scanning direction based on the amount of movement.

14. The non-transitory recording medium according to claim 12, wherein the correcting includes forming the inclination-corrected line in the main scanning direction at a cycle shorter than a cycle in which the image data is sequentially read line by line in the main scanning direction.

15. The non-transitory recording medium according to claim 12, wherein the calculating includes calculating the inclination of the original image with respect to the main scanning direction based on the image data.

16. The non-transitory recording medium according to claim 12, wherein the calculating includes calculating an amount of movement of a left corner of the original image with respect to the sub-scanning direction, before and after correction of the inclination, upon the image data being rotated clockwise to correct the inclination, and includes calculating an amount of movement of a right corner of the original image with respect to the sub-scanning direction, before and after the correction of the inclination, upon the image data is being rotated counterclockwise to correct the inclination.

* * * * *